(12) United States Patent
Jain et al.

(10) Patent No.: US 12,294,575 B2
(45) Date of Patent: *May 6, 2025

(54) SELF-FEDERATION IN AUTHENTICATION SYSTEMS

(71) Applicant: Citrix Systems, Inc., Fort Lauderdale, FL (US)

(72) Inventors: Ayush Jain, North Lauderdale, FL (US); Ricardo Feijoo, Davie, FL (US)

( * ) Notice: Subject to any disclaimer, the term of this patent is extended or adjusted under 35 U.S.C. 154(b) by 494 days.

This patent is subject to a terminal disclaimer.

(21) Appl. No.: 17/485,695

(22) Filed: Sep. 27, 2021

(65) Prior Publication Data

US 2022/0014517 A1 Jan. 13, 2022

Related U.S. Application Data

(63) Continuation of application No. 16/198,249, filed on Nov. 21, 2018, now Pat. No. 11,159,517.

(51) Int. Cl.
*H04L 29/06* (2006.01)
*H04L 9/40* (2022.01)

(52) U.S. Cl.
CPC ...... *H04L 63/0853* (2013.01); *H04L 63/0815* (2013.01); *H04L 63/0838* (2013.01)

(58) Field of Classification Search
CPC ............. H04L 63/0807; H04L 63/0853; H04L 63/0815; H04L 63/0838; H04L 9/3213; H04L 2463/082
See application file for complete search history.

(56) References Cited

U.S. PATENT DOCUMENTS

| | | | |
|---|---|---|---|
| 2003/0023798 A1* | 1/2003 | Appleby ............. | H04L 67/1008 710/240 |
| 2007/0186106 A1 | 8/2007 | Ting et al. | |
| 2009/0183246 A1* | 7/2009 | Kokologiannakis .... | G06F 21/31 726/7 |

(Continued)

OTHER PUBLICATIONS

"Execute an Authorization Code Grant Flow," found at Auth0 Docs, Articles, API Authorization, Execute an Authorization Code Grant Flow, 7 pages, https://auth0.com/docs/api-auth/tutorials/authorization-code-grant, Accessed Nov. 15, 2018.

(Continued)

*Primary Examiner* — Yogesh Paliwal

(57) ABSTRACT

Aspects described herein may utilize self-federation in a plugin-based authentication system to support combinations of authentication processes. The authentication system may include a plugin that executes an authentication process that is a combination of two or more other authentication processes. This plugin may handle the combined authentication process by self-federating back to the authentication interface, generating its own authentication requests under each of the subsidiary authentication processes. Thus, the self-federating plugin corresponding to the combined authentication process may allow the authentication system to support authentication requests that indicate the combined authentication process. This "chained" authentication process, accomplished through self-federation, may allow the authentication system to reuse existing code paths and avoid downsides associated with duplication of code.

15 Claims, 8 Drawing Sheets

(56) References Cited

U.S. PATENT DOCUMENTS

| | | | | |
|---|---|---|---|---|
| 2010/0132019 | A1* | 5/2010 | Hardt | H04L 63/102 |
| | | | | 726/6 |
| 2015/0341334 | A1* | 11/2015 | Bhimanaik | G06F 21/335 |
| | | | | 726/4 |
| 2016/0087957 | A1* | 3/2016 | Shah | H04L 63/205 |
| | | | | 726/1 |
| 2016/0294562 | A1 | 10/2016 | Oberheide et al. | |
| 2018/0075231 | A1 | 3/2018 | Subramanian et al. | |

OTHER PUBLICATIONS

Wikipedia, Federated Identity, page last edited Aug. 5, 2018, retrieved from https://en.wikipedia.org/w/index.php?title=Federated_identity&oldid=853575334.

ISR And WO in PCT/US/19/57863 dated Jan. 27, 2020.

Sep. 18, 2020—(US) Non-final Office Action—U.S. Appl. No. 16/198,249.

Mar. 31, 2021—(US) Notice of Allowance—U.S. Appl. No. 16/198,249.

Mathias Sundman, "2FA—AD password and external OTP via RADIUS proxy" XP055657467, website https://wiki.freeradius.org/guide/2FA-Active-Directory-plus-Proxy retrieved Jan. 13, 2020, dated Mar. 1, 2018, pp. 1-4.

Jun. 28, 2021—(US) Notice of Allowance—U.S. Appl. No. 16/198,249.

\* cited by examiner

SELF-FEDERATION IN AUTHENTICATION SYSTEMS

CROSS-REFERENCE TO RELATED APPLICATIONS

The present application claims priority to and is a Continuation of U.S. Ser. No. 16/198,249, filed on Nov. 21, 2018 entitled "Self-Federation in Authentication Systems," which is hereby incorporated by reference as to its entirety.

TECHNICAL FIELD

Aspects of the disclosure relate to computer hardware and software. In particular, one or more aspects of the disclosure generally relate to computer hardware and software for generation and management of authentication tokens to interact with multiple services provided by various identity providers in a virtualized environment.

BACKGROUND

Authentication systems may allow users to access enterprise services by authenticating the identity and permissions of the user through various authentication processes. A relying party, in seeking to provide network services to a client device, may provide an authentication request to the authentication system, and the authentication system may interface with one or more systems to authenticate the user. The authentication system may return a token that the relying party can use to provide access the enterprise services. Authentication requirements may be configured as part of the client system, and may include processes such as Active Directory (AD) or One Time Password (OTP).

Federation in authentication systems may provide common authentication processes for a user's identity across multiple systems and applications. Federation may be implemented using industry standards, such as the OAuth 2.0 standard. Authentication requests may flow through software modules tasked with handling aspects of the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Federating to other parties may present challenges regarding trust, code flow, and other concerns. Problems may arise when it is desired to authenticate with multiple identity services, and some relying parties may not be able to themselves implement the specific requirements of the flows associated with authentication processes. These problems are associated with computer-implemented authentication systems, and are rooted in the computer structures and functionality used in such systems. To overcome these limitations, and to overcome other limitations that will be apparent upon reading and understanding the present specification, aspects described herein are directed towards using self-federation in a multi-federation authentication system to support combined authentication processes.

Aspects described herein may relate to a plugin-based authentication system. The authentication system may comprise an authentication interface and a plurality of plugins corresponding to different authentication processes. When the authentication interface receives a request to authenticate a client device from a relying party, such as an enterprise server, the authentication interface may call a plugin corresponding to an authentication process associated with the client request to authenticate. A relying party may be a server and/or other computer device, or a service, that utilizes an authentication system to authenticate a client device. Typically, a relying party may request that the authentication system authentication the client device in response to a client request to access services that are secured by the authentication system. In some instances, the authentication system may serve as an interface to other systems, such as third party systems, that include information and functionality effective to securely authenticate a user of the client device. According to some aspects described further herein, multiple authentication processes may be combined in a single request, and the combined process may be handled by a corresponding plugin. The plugin corresponding to the combined authentication process may self-federate to the authentication interface to process each of the individual authentication processes in the combined request. For example, the plugin corresponding to the combined authentication process may generate its own individual authentication requests for the authentication interface to handle. The authentication interface may call respective plugins corresponding to each of the individual authentication processes, and return the results to the plugin corresponding to the combined authentication process. The plugin corresponding to the combined authentication process may combine the results from each of the plugins associated with the individual authentication processes, and the combined authentication token may be returned to the enterprise server via the authentication interface. Self-federation in this manner may allow the authentication system to support a combination of authentication flows. Additionally, self-federation may allow the authentication system to change flows from one form to another, such as from an authentication code flow to a resource owner flow.

Thus, some aspects described herein may provide methods, systems, and computer-readable media for processing an authentication request that corresponds to multiple authentication processes. An authentication interface may receive a first request to authenticate a client device using a first type of authentication process from an enterprise server. The first type of authentication process may be a combination of authentication processes. For example, the first type of authentication process may comprise authenticating a user via a second type of authentication process and a third type of authentication process. The authentication interface may call, based on the first request, a first plugin corresponding to the first type of authentication process to generate a first authentication token. The first plugin may be configured to generate the first authentication token through self-federation to the authentication interface to obtain a second authentication token corresponding to the second authentication process and a third authentication token corresponding to the third authentication process from other plugins corresponding to those authentication processes. While the enterprise server is the relying party in the first request to the authentication interface (based on the combined authentication process), the first plugin may be considered the relying party in the individual requests to the authentication interface to handle the second and third types of authentication processes.

For example, the first plugin may generate and send to the authentication interface a second request to authenticate the client device using the second type of authentication process. The authentication interface may return to the first plugin a second authentication token generated by calling a second plugin corresponding to the second type of authentication process based on the second request. The first plugin may generate and send to the authentication interface a third request to authenticate the client device using the third type of authentication process. The authentication interface may return to the first plugin a third authentication token generated by calling a third plugin corresponding to the third type of authentication process based on the third request. The first plugin may combine the second authentication token and the third authentication token in generating the first authentication token corresponding to the combined authentication process, and provide the first authentication token to the authentication interface. The authentication interface may provide the first authentication token to the enterprise server. The enterprise server may use the first authentication token to provide the client device with access network services secured by the first authentication process.

The plugins corresponding to the individual types of authentication processes included in the combined authentication process may be configured to handle and/or process an authentication flow corresponding to the authentication process type. For example, a second plugin corresponding to the second type of authentication process may gather user credentials and request the second authentication token from a resource owner system. Similarly, a third plugin corresponding to the third type of authentication process may gather necessary credentials and authenticate with a resource owner system. According to some aspects, the authentication system may implement single-sign on features. If the user has previously authenticated with a particular resource owner system and/or through a particular authentication process, the authentication system may provide stored single-sign on credentials/tokens without needing to re-gather credentials and re-authenticate with the resource owner system. While single-sign on credentials/tokens may be associated with timing and/or use restrictions, they may allow users to avoid duplicative credential prompts when re-accessing resources within the parameters of the single-sign on system.

The first authentication process may comprise a combination of authentication processes based on different credentials. For example, the second authentication process may be based on requesting a user name and password from the user, such as an Active Directory (AD) authentication process. The third authentication process, in the example, may be based on a two-factor authentication process, such as a One Time Password (OTP) authentication process. In this example, client applications may request that the authentication interface authenticate the client device/user based on a combination of Active Directory and One Time Password authentication processes. Client applications may include, for example, applications on a server accessed by users via a client device. The client applications may provide a service to the user using information and/or functionality provided by network resources and services. The network resources and services may be secured by one or more authentication processes, and access may be facilitated by and/or controlled by the authentication system. Continuing the example, the authentication interface may call a plugin that corresponds to the combination of AD+OTP based on the request to authenticate. The AD+OTP plugin may make its own requests to the authentication interface to call the appropriate plugin to handle each part of the combined request. Thus, through self-federation, the AD+OTP plugin may go through the authentication interface to leverage existing and managed code paths to process authentication for each requested type of authentication.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
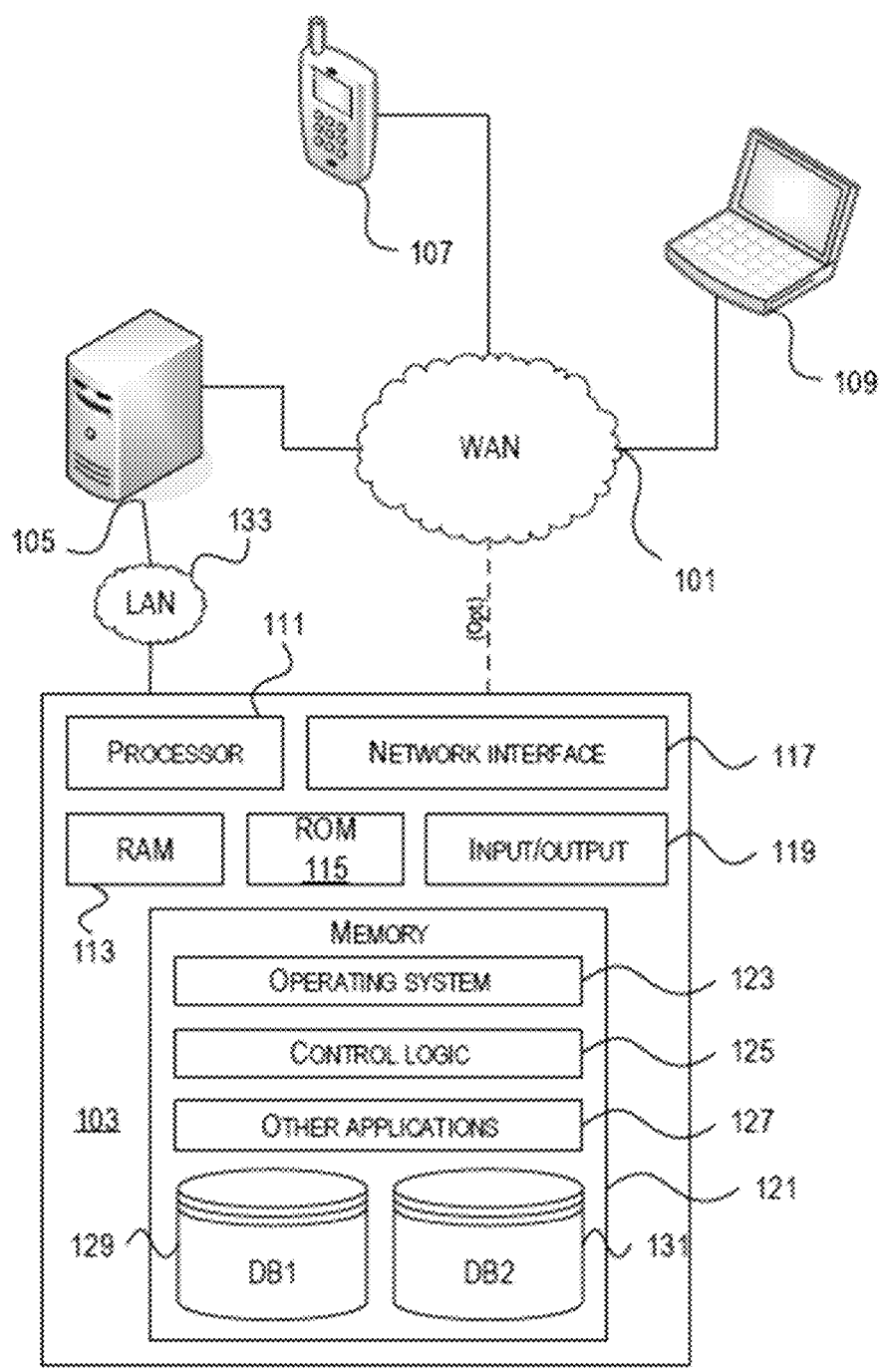
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As explained above, aspects described herein may utilize self-federation in a plugin-based authentication system to support combinations of authentication processes. As discussed above and further herein, federation in authentication systems may allow one authentication system to invoke functionality of a federated identity provider. Federation may be implemented using industry standards, such as the OAuth 2.0 standard. Through federation, authentication requests may flow through software modules tasked with handling aspects of the authentication process. Aspects described herein may relate to components "self-federating" back to the authentication system to implement individual portions of a compound workflow.

An authentication system may be provided to handle and respond to authentication requests from relying parties. The authentication system may serve as an interface to various federated identity providers. The authentication system may be implemented using one or more computing devices, processors, memory, and/or other computing hardware as discussed further herein. The authentication system may include suitable software code modules to respond to the authentication requests and implement the authentication processes supported by the system. The authentication system may include a plugin corresponding to an authentication process that is a combination of two or more other authentication processes. This plugin may handle the combined authentication process by self-federating back to the authentication interface, generating its own authentication requests under each of the subsidiary authentication processes. Authentication requests may include an indication of an authentication process to be used in authenticating the client device and/or user. The indication may be, for example, an explicit request to invoke a particular authentication process and/or an implicit request, where the authentication process may be determined based on an indication of the resources to be accessed. The self-federating plugin corresponding to the combined authentication process may allow the authentication system to support authentication requests that indicate the combined authentication process. This "chained" authentication process, accomplished through self-federation, may allow the authentication system to reuse existing code paths and avoid downsides associated with duplication of code.

As an example, consider an authentication system that supports user name and password verification via a first authentication process, such as Active Directory (AD), and supports two-factor verification via a second authentication process, such as One Time Password (OTP). If a relying party such as an enterprise server wanted to authenticate a client device via the AD process, the relying party may send an authentication request to the authentication system. An authentication interface of the authentication system may route the authentication request to a corresponding AD plugin, which may prompt the user to enter the user name and password before authenticating with a customer AD system. But if it is desirable for the enterprise server to authenticate using both AD and OTP, the client application may need to generate two separate authentication requests. Aspects described herein may provide a plugin corresponding to the combined authentication process, such as AD+OTP. This AD+OTP plugin may self-federate back to the authentication interface of the authentication system and generate requests for the AD authentication and for the OTP authentication, which will be handled by the respective AD and OTP plugins. The AD+OTP plugin may receive the resulting authentication tokens for the AD and OTP requests from the authentication interface, and may combine the tokens for use by the client application. The combined token may be returned to the enterprise server via the authentication interface so that the user can access the system.

Although examples herein discuss AD, OTP, and AD+OTP authentication processes, it should be understood that these are exemplary embodiments only. Aspects described herein may apply to any types of authentication processes supported by an authentication system, and any combination thereof. Despite the use of these example authentication processes, the discussion herein applies equally to other types and combinations of authentication processes.

Figure 2:
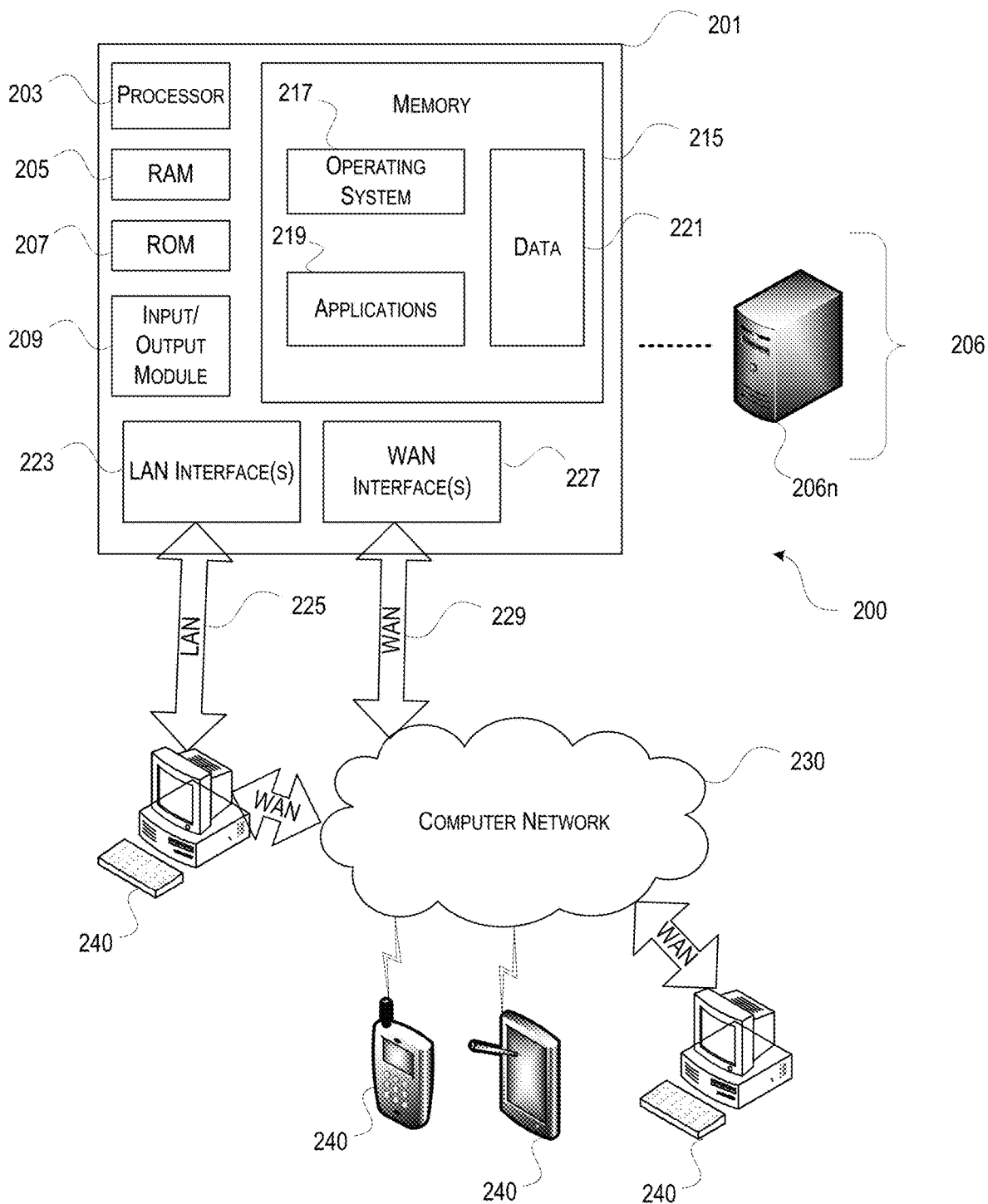
FIG. 2 depicts an illustrative remote-access system architecture that may be used in accordance with one or more illustrative aspects described herein.
Figure 3:
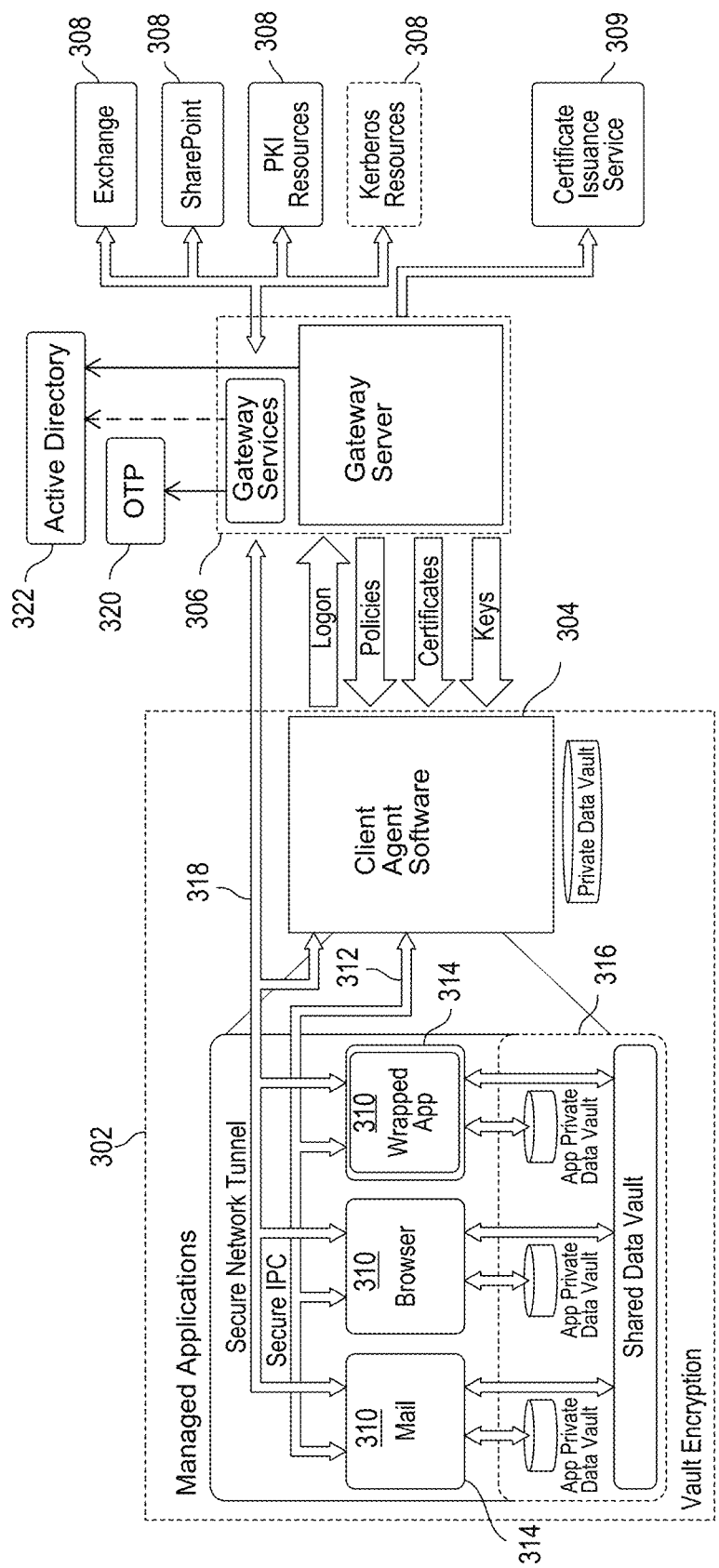
FIG. 3 depicts an illustrative enterprise mobility management system.

But before discussing these and other aspects further, discussion will turn to example computing environments in which aspects described herein may be implemented, as illustrated in FIGS. 1-3.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines.

FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 3 is an illustrative enterprise mobility management system 300. In this case, the left hand side represents an enrolled mobile device 302 with a client agent 304, which interacts with gateway server 306 (which includes Access Gateway and application controller functionality) to access various enterprise resources 308 and services 309 such as Exchange, Sharepoint, public-key infrastructure (PKI) Resources, Kerberos Resources, Certificate Issuance service, as shown on the right hand side above. Although not specifically shown, the mobile device 302 may also interact with an enterprise application store (StoreFront) for the selection and downloading of applications.

The client agent 304 acts as the UI (user interface) intermediary for Windows apps/desktops hosted in an Enterprise data center, which are accessed using the High-Definition User Experience (HDX)/ICA display remoting protocol. The client agent 304 also supports the installation and management of native applications on the mobile device 302, such as native iOS or Android applications. For example, the managed applications 310 (mail, browser, wrapped application) shown in the figure above are all native applications that execute locally on the mobile device 302. Client agent 304 and application management framework of this architecture act to provide policy driven management capabilities and features such as connectivity and SSO (single sign on) to enterprise resources/services 308. The client agent 304 handles primary user authentication to the enterprise, normally to Access Gateway (AG) 306 with SSO to other gateway server components. The client agent 304 obtains policies from gateway server 306 to control the behavior of the managed applications 310 on the mobile device 302.

The Secure InterProcess Communication (IPC) links 312 between the native applications 310 and client agent 304 represent a management channel, which may allow a client agent to supply policies to be enforced by the application management framework 314 "wrapping" each application. The IPC channel 312 may also allow client agent 304 to supply credential and authentication information that enables connectivity and SSO to enterprise resources 308. Finally, the IPC channel 312 may allow the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 may request policy information from client agent 304, which in turn may request it from gateway server 306. The application management framework 314 may request authentication, and client agent 304 may log into the gateway services part of gateway server 306 (also known as NETSCALER ACCESS GATEWAY). Client agent 304 may also call supporting services on gateway server 306, which may produce input material to derive encryption keys for the local data vaults 316, or may provide client certificates which may enable direct authentication to PM protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel 312 and obtain the policy for that application. The application management framework 314 may enforce relevant portions of the policy that apply locally, such as the client agent login dependencies and some of the containment policies that restrict how local OS services may be used, or how they may interact with the managed application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through Access Gateway 306. The application management framework 314 may be responsible for orchestrating the network access on behalf of each managed application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 have special status and may make use of facilities that might not be generally available to arbitrary wrapped applications. For example, the Mail application 310 may use a special background network access mechanism that allows it to access an Exchange server 308 over an extended period of time without requiring a full AG logon. The Browser application 310 may use multiple private data vaults 316 to segregate different kinds of data.

This architecture may support the incorporation of various other security features. For example, gateway server 306 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 316 (containers) on the mobile device 302. The vaults 316 may be encrypted so that all on-device data including files, databases, and configurations are protected. For on-line vaults, the keys may be stored on the server (gateway server 306), and for off-line vaults, a local copy of the keys may be protected by a user password or biometric validation. If or when data is stored locally on the mobile device 302 in the secure container 316, it may be preferred that a minimum of AES 256 encryption algorithm be utilized.

Other secure container features may also be implemented. For example, a logging feature may be included, wherein security events happening inside a managed application 310 may be logged and reported to the backend. Data wiping may be supported, such as if or when the managed application 310 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 302 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 314 may be prevented in other ways. For example, if or when a managed application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text may be sent to the user with an OTP 320. In some cases, this may be implemented only for online use, with a prompt being a single field.

An offline password may be implemented for offline authentication for those managed applications 310 for which offline use is permitted via enterprise policy. For example, an enterprise may want StoreFront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 310 as secondary credentials (for the purpose of accessing PM protected web resources via the application management framework micro VPN feature). For example, a managed application 310 may utilize such a certificate. In this case, certificate-based authentication using ActiveSync protocol may be supported, wherein a certificate from the client agent 304 may be retrieved by gateway server 306 and used in a keychain. Each managed application 310 may have one associated client certificate, identified by a label that is defined in gateway server 306.

Gateway server 306 may interact with an enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PM protected network resources. More than one certificate may be supported, such as to match various levels of security and/or separation requirements. The certificates may be used by the Mail and Browser managed applications 310, and ultimately by arbitrary wrapped applications 310 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 310 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 310 is not running.

A multi-site architecture or configuration of enterprise application store and an application controller may be supported that allows users to be serviced from one of several different locations in case of failure.

In some cases, managed applications 310 may be allowed to access a certificate and private key via an API (for example, OpenSSL). Trusted managed applications 310 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

As discussed above, aspects of the disclosure relate to utilizing self-federation in an authentication system to provide enhanced authentication processes. One or more aspects of the disclosure may incorporated in, be embodied in, and/or be implemented using one or more of the computer system architecture, remote-access system architecture, and/or enterprise mobility management systems discussed above in connection with FIGS. 1-3. For example, gateway server 306 may be configured to provide a plugin-based authentication system, such as Citrix's ATHENA authentication system product. The plug-in based authentication system may be configured to federate to multiple third party authentication systems (also known as federation providers). This federation may be done using the OAuth 2.0 flow by securely redirecting to the federation provider and doing a token exchange. The authentication interface itself may not collect credentials for federation providers itself. Instead, the plug-in software modules may interface with the third party authentication systems to retrieve user credentials and authenticate the user.

Figure 4:
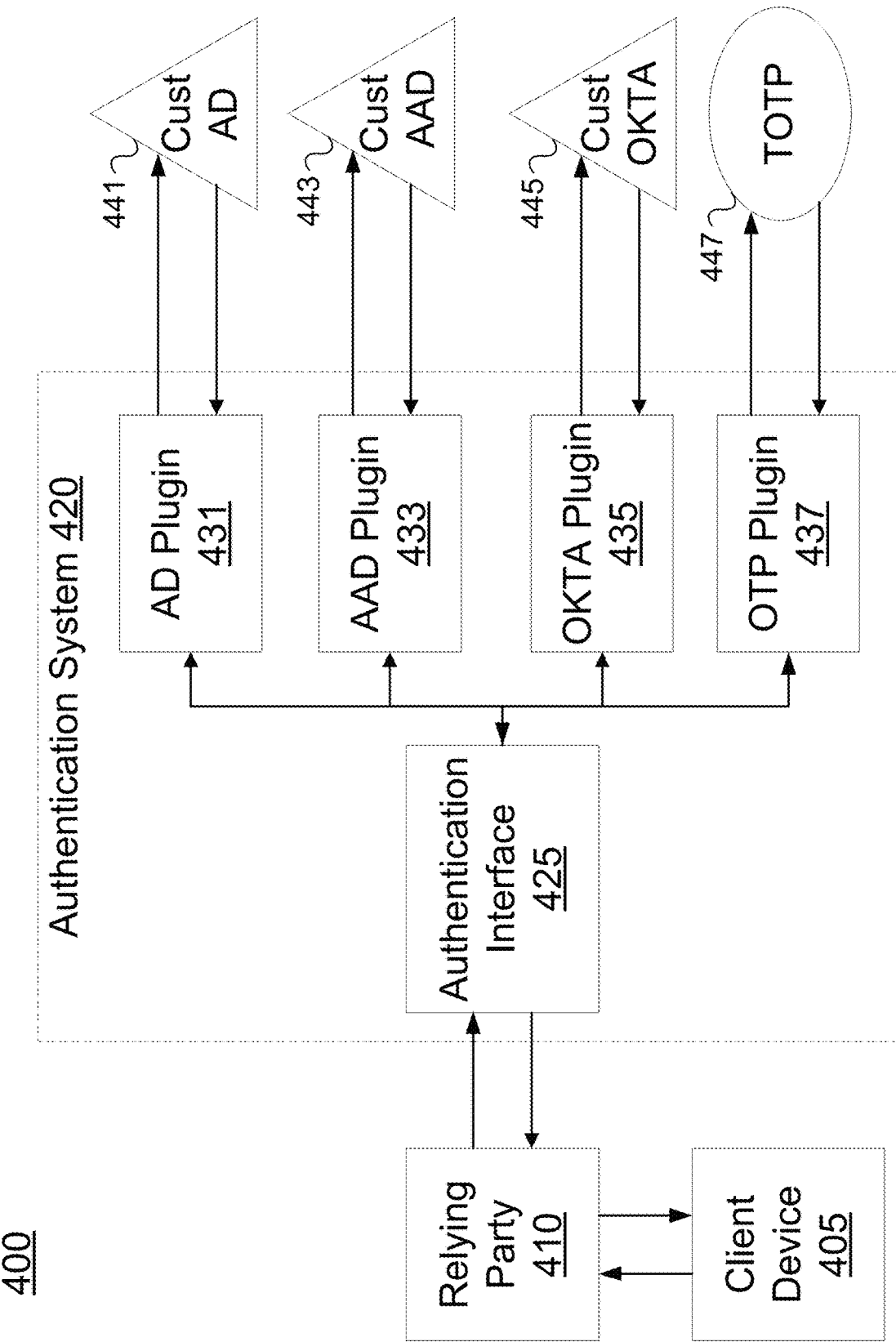
FIG. 4 depicts an example plugin-based authentication system.

FIG. 4 depicts an illustrative example of such a plugin-based authentication system in accordance with one or more aspects described herein. In particular, FIG. 4 illustrates an computing environment 400 comprising a client device 405, a relying party 410, an authentication system 420, and a plurality of federated identity providers 441, 443, 445, 447. Examples of federated identity provides include customer AD server 441, customer AAD server 443, customer OKTA server 445, and one time password server 447 as discussed further below. Each illustrated entity may include one or more physical components, such as one or more processors, memories, communication interfaces, and/or the like.

Relying party 410 may be a server that provides services to client device 405, and may be any type of computing device including, for example, a server, computer, laptop, tablet, smartphone, or other device that includes a processor (e.g., computing device 201). Relying party 410 may communicate, via communication interfaces (e.g., wireless interfaces, LAN interfaces, WLAN interfaces), with client device 405 and other devices and/or entities such as authentication system 420 to request authentication to access network services and data, as discussed in greater detail below. Relying party 410 may be an enterprise server, which may be a server responsible for providing and managing a virtual, cloud-based environment that may be accessed by one or more enterprise users via client device 405. In an example use case, relying party 410 may be a server of an enterprise that an employee logs into for authentication to access the enterprise's virtual, cloud-based environment (e.g., a virtual desktop, a virtual application, a virtual mobile app, or other virtual service(s)).

Authentication system 420 may be an enterprise identity provider server, and may include at least one processor, memory, and communication interfaces. The processor may execute instructions stored in memory to cause authentication system 420 to perform one or more functions, such as retrieving an authentication token corresponding to an authentication request from relying party 410. The communication interfaces may include one or more network interfaces via which authentication system 420 can communicate with one or more other systems and/or devices in computing environment 400, such as relying party 410 and/or federated identity providers 441, 443, 445, 447.

Authentication system 420 may be a server responsible for providing an identity management platform in an enterprise network. Specifically, authentication system 420 may be responsible for generating, updating, and managing authentication tokens for enterprise users and/or their respective devices to use in authenticating with and accessing resources of a virtual, cloud-based environment (e.g., resources provided in computing environment 400). As such, relying party 410 may obtain an authentication token from authentication server 420 on behalf of user devices (e.g., client device 405) that enables the user devices to access the services and resources in an enterprise system. For example, a relying party may direct the user to log into an identity management platform provided by authentication system 420 and obtain an authentication token from the identity management platform (e.g., a federated identity provider such as customer AD server 441).

Authentication system 420 may issue an authentication token to an authenticated user (e.g., a user that successfully authenticates with a federated identity provider) as a result of successfully completing an authentication procedure (e.g., logging in) in the enterprise network. In one example, users of client devices may log into a virtualized, cloud-based environment using their existing authentication credentials, which may be a username and password, biometric measurement (e.g., fingerprint scan, retina scan, facial recognition, voice recognition, etc.), entering an access code provided to a specified user device (e.g., the user's smartphone may receive a message containing a code to enter into a portal provided by the relying party), or any other authentication means for access to the enterprise network. In response to the successful logging in of the user device, authentication system 420 may issue an authentication token for the authenticated user and forward the authentication token to relying party 410, which in turn may enable user devices to have single sign on (SSO) access to the services and resources in the virtualized, cloud-based environment within the enterprise network. In this fashion, authentication system 420 may provision relying party 410 with the requested authentication token.

Computing environment 400 may include one or more federated identity providers, such as federated identity providers 441, 443, 445, 447, which may be responsible for generating, updating, and managing tokens of users for use in the public network for access to third party systems. In some instances, the authentication tokens issued by authentication system 420 might not be recognized and interpreted by the federated identity provider servers. As a result, the authentication tokens that enables the user devices to access the enterprise system, might not be sufficient to permit the user devices to access third party systems. In this scenario, authentication system 420 may re-direct requests to access third party systems from user devices via relying party 410 to a login page managed and authenticated by a corresponding federated identity provider server.

This may be accomplished using an authentication interface 425 and corresponding authentication process plugins 431, 433, 435, 437. Requests to authenticate may be received by the authentication system 420 via authentication interface 425. Authentication interface 425 may inspect the request to authenticate and determine an indicated authentication process. For example, an authentication request may explicitly indicate the corresponding authentication process using a parameter or other information included in the request. As another example, the authentication request may implicitly indicate the corresponding authentication process. The authentication interface may determine the corresponding authentication process based on the type of resource requested. As one example of this, the authentication interface may determine that an AD authentication process should be used when the authentication request indicates that the user is requesting access to a mail server that is secured using customer AD server 441. The request may be routed to a plugin (e.g., plugins 431, 433, 435, 437) corresponding to the indicated authentication process. The plugin may conduct the authentication process in coordination with the federated identity provider server (e.g., server 441, 443, 445, and/or 447) corresponding to the indicated authentication process and retrieve a corresponding authentication token. The plugin may return the authentication token to the authentication interface 425, which may pass it on to the relying party 410.

One or more federated identity provider servers may be a server responsible for providing an identity platform for federated logon access to third party systems in a public network. Specifically, federated identity provider server 441 may be responsible for generating, updating, and managing tokens for user devices to have access to third party systems secured using an Active Directory (AD) authentication process. Authentication system 420 may provide AD plugin 431 to process and forward a request to authenticate with customer AD server 441, and authentication system 420 may be configured to receive and return an authentication token associated with the customer AD server 441 in response to authentication. Similarly, customer Azure AD server 443 may manage access to resources secured by an Azure Active Directory (AAD) authentication process, and AAD plugin 433 may handle processing for the authentication system 420. Customer OKTA server 445 may manage access to resources secured by Okta identity management services, and OKTA plugin 435 may handle processing for the authentication system 420. TOTP server 447 may provide time-based One Time Passwords (OTP) used to secure some network resources, and OTP plugin 437 may handle processing for the authentication system 420. As such, relying party 410 may obtain an authentication token from federated identity provider server on behalf of user devices that enables user devices to access the services and resources in third party systems. For example, relying party 410 may direct a user of client device 405 to log into an identity platform (such as a web page provided by authentication system 420 and/or customer AD server 441) with their user name and password as part of an AD authentication process provided by customer AD server 441 and obtain an AD authentication token.

Use of these plugins may allow system administrators to configure authentication flows as desired. Each plugin may be tasked with handling a different authentication process. As exampled above, the AD plugin 431 may be configured to interface with customer AD server 441. AD plugin 431 may coordinate with customer AD server 441 to retrieve user credentials (e.g., user name and password), authenticate the user, and retrieve an AD authentication token. AD plugin 431 may convert the AD authentication token to a standard format for use in the enterprise network and with authentication system 420. For example, authentication system 420 may utilize a common data format to provide identity/authentication tokens to relying parties, and that format may differ from a format employed by the servers 441, 443, 445, and/or 447. The converted, standard format token may be returned via application interface 425 to relying party 410. Relying party 410 may not ever have access to the user's user name and password, as this step is securely handled by the corresponding plugin of authentication system 420.

Figure 5:
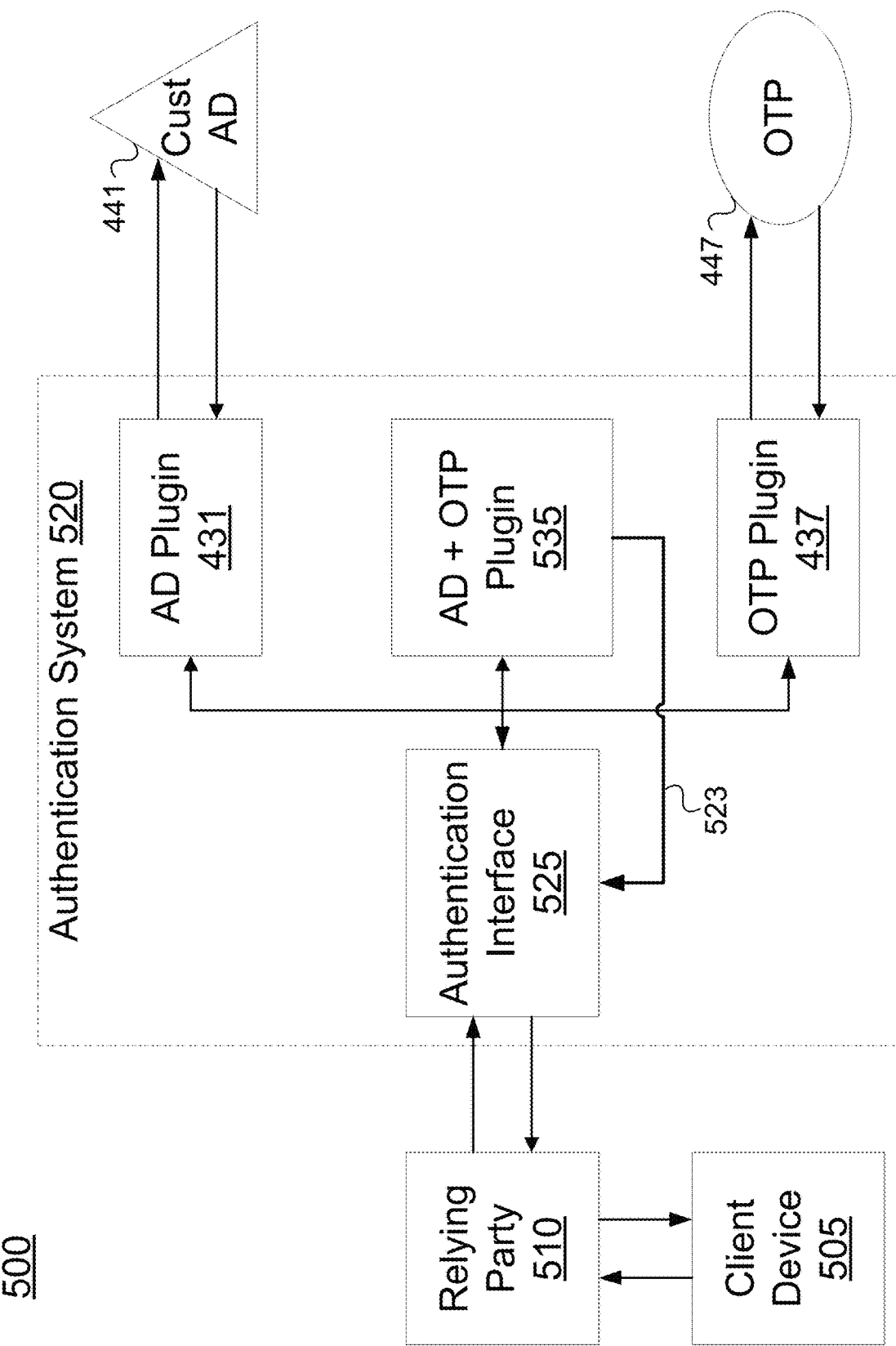
FIG. 5 depicts an example plugin-based authentication system incorporating self-federation, according to some aspects described herein.

FIG. 5 illustrates a computing environment 500 comprising an authentication system 520 that may use self-federation 523 to support compound or combined authentication flows. In the example of FIG. 5, relying party 510 may request authorization for a client device 505 to access resources secured by a combined Active Directory (AD) and One Time Password (OTP) authentication process. Authentication system 520 may include authentication interface 525 (which may correspond to authentication interface 425), AD plugin 431, and OTP plugin 437. As an improvement over the system of FIG. 4, authentication system 520 may further include AD+OTP plugin 535, which may be configured to handle the combined AD+OTP authentication process using self-federation 523 back to authentication interface 525.

As was discussed above regarding FIG. 4, relying party 510 in FIG. 5 may send requests to authenticate to authentication interface 525. Authentication interface 525 may inspect the request to authenticate, determine the corresponding authentication process, and pass handling of the authentication request to a suitable plugin software module. For example, relying party 510 may send a request for authentication to the authentication interface indicating that relying party 510 would like to authenticate a client device 505 using a combined AD and OTP authentication process. In the example, the authentication request sent by relying party 510 to authentication system 520 may include a parameter indicating that the type of authentication requested is AD+OTP. Authentication interface 525 may determine that the authentication request indicates the combined AD+OTP process, and may call AD+OTP plugin 535 to handle the request. In response, AD+OTP plugin 535 processes the request to generate a combined AD+OTP authentication token in the format of the authentication system as described further below.

AD+OTP plugin 535 may utilize self-federation 523 back to authentication interface 525 to process the AD authentication component and the OTP authentication component of the combined authentication process. AD+OTP plugin 535 may make authentication requests of its own to authentication interface 525. That is, AD+OTP plugin 535 may make subsidiary requests acting as a relying party itself. This self-federation, according to aspects herein, may provide a beneficial and elegant solution to implementing compound authorization flows in an authorization system supporting multiple types of federation. For example, this self-federation allows the authentication system 520 to reuse existing code paths and avoids complications associated with duplicate code logic for handling the same authentication processes. Application interface 525 may process each of the authentication requests made by the AD+OTP plugin 535 (as a relying party) by calling the appropriate plugins to handle, which in the example would be AD plugin 431 and OTP plugin 437. AD plugin 431 and OTP plugin 437 interface with customer AD server 441 and OTP server 447 respectively to receive user credentials, authenticate the user credentials, and generate an AD or an OTP authentication token. These individual authentication tokens may be returned via authentication interface 525 to the AD+OTP plugin 535, which may combine the tokens and return a combined AD+OTP authentication token to the original relying party 510 via authentication interface 525.

Figure 6:
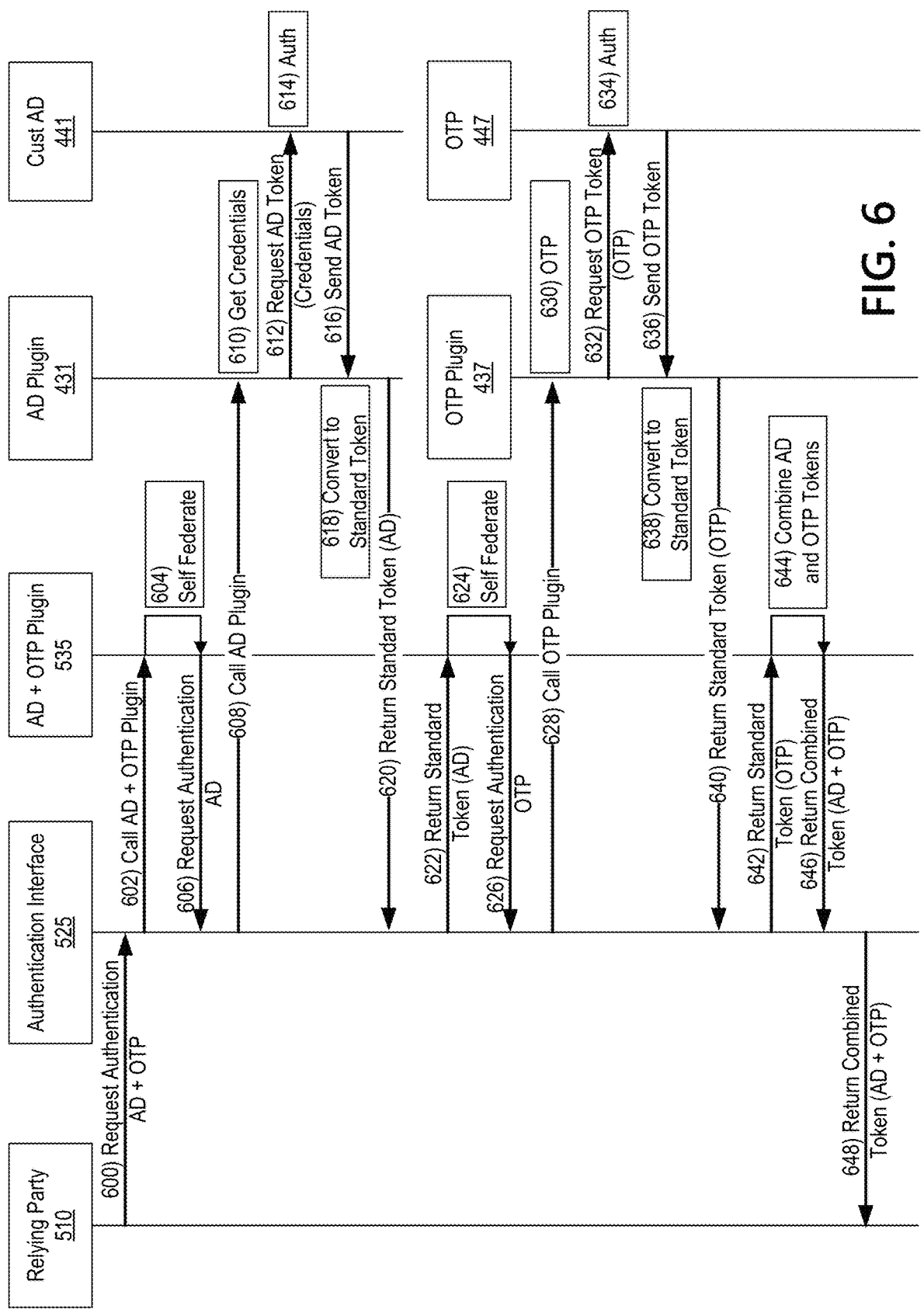
FIG. 6 depicts an example flow chart for use of self-federation in an authentication system, according to some aspects described herein.

FIG. 6 indicates the processing flows performed by authentication system 520 and the other elements in computing environment 500. Specifically, FIG. 6 illustrates processing flows corresponding to a request by relying party 510 to authenticate client device 505 using a compound AD and OTP authentication process. Steps illustrated in FIG. 6 are performed by relying party 510, authentication interface 525, AD+OTP plugin 535, AD plugin 431, customer AD server 441, OTP plugin 437, and OTP server 447. AD+OTP plugin 535 may utilize self-federation back to authentication interface 525 (see steps 604-606 and 624-626) to perform the compound AD and OTP authentication process.

At step 600, relying party 510 may send a request to authenticate client device 505 to authentication interface 525. The request may indicate that client device 505 should be authenticated using AD and OTP authentication processes. Step 600 may be prompted by a user of client device 505 requesting to access one or more services or resources of an enterprise system. For example, the user may attempt to log into a virtual desktop, web application or mobile application to access a virtual, cloud-based enterprise system where enterprise servers may be integrated with a particular enterprise identity service provided by an enterprise identity provider server (e.g., authentication system 520). Subsequently, the enterprise server may forward such requests, as relying party 510, on behalf of user devices to authentication interface 525 for authentication. The request may indicate information about the user and/or user device as appropriate. However, the relying party 510 usually will not itself acquire or request user credentials (e.g., a user name and password) from the user or user device. Because the authentication system 525 and its plugins (like AD plugin 431) securely gather the user credentials, relying party 510 does not need to access the user credentials.

At step 602, the authentication interface 525 may inspect the request for authentication received from relying party 510 and determine a suitable plugin to handle the type of authentication associated with the request. For example, authentication interface 525 may determine that AD+OTP plugin 535 corresponds to the requested type of authentication process (e.g., compound AD+OTP authentication) based on a parameter in the authentication request that indicates (explicitly or implicitly) that the resource to be accessed is secured using AD+OTP authentication. As illustrated, the request to authenticate the user device may be forwarded to the proper plugin (e.g., AD+OTP plugin 535) for handling via a call of the plugin by authentication interface 525.

Having been called to handle the request to authenticate the user device, AD+OTP plugin 535 may execute logic to handle each component authentication process of the compound authentication process indicated in the request. In the illustrated example, AD+OTP plugin 535 may execute logic configured to generate an AD authentication request for the user device and logic configured to generate an OTP authentication request for the user device. As discussed further herein, AD+OTP plugin 535 may receive a result of both subsidiary authentication requests, combine the resulting authentication tokens into a combined token, and respond to the call from authentication interface 525's call from step 602. In some embodiments, the AD token and the OTP token may be used by the system to generate a single token that is recognizable by authentication system 520 in later requests. The combined token may not have meaning outside of authentication system 520, but relying parties may present the combined token to authentication system 520 in later requests and authentication system 520 may use the previously retrieved AD token and OTP token to support single sign on (SSO) features. In other embodiments, the AD token and OTP token may be combined into a single data structure that stores all or at least a portion of the information in the AD token and OTP token.

Thus, at step 604, AD+OTP plugin 535 may self-federate back to the authentication interface 525 and, at step 606, send a request to authenticate the user device using an AD authentication process to authentication interface 525.

Application interface 525 may receive the request to authenticate the user device using the AD authentication process from AD+OTP plugin 535, and may treat the AD+OTP plugin 535 as the relying party for that request. Application interface 525 may handle the request from AD+OTP plugin 535 just like other requests. For example, application interface 525 may determine that the request from AD+OTP plugin 535 corresponds to an AD authentication process, and may determine that AD plugin 431 should handle the request. Thus, at step 608, application interface 535 may call AD plugin 431 to handle the AD authentication request received from AD+OTP plugin 535 as a relying party. Although FIG. 6 indicates sequential handling, in some embodiments parallel processing may be incorporated. Handling both authentication processes simultaneously may improve speed in handling authentication requests.

At step 610, AD plugin 431 may get user credentials associated with the user and/or user device being authenticated. AD plugin 431 may get user credentials by generating a prompt for a user of the user device to enter the credentials, such as a user name and password. AD plugin 431 may, at step 612, request to authenticate the user device with customer AD server 441. Customer AD server 441 may be a federated identity provider, and may be associated with the enterprise hosting authentication system 520 and/or a third party network. The request may be to obtain a second authentication token, an AD authentication token (with the first being the to-be-created combined AD+OTP token). The request may comprise the gathered user credentials. At step 614, customer AD server 441 may authenticate the user based on the credentials in the request. If the user successfully authenticates, customer AD server 441 may respond to the AD plugin 431 with an AD authentication token at step 616. For example, as a result of the user successfully logging into the virtual, cloud-based enterprise system, customer AD server 441 may issue the AD authentication token. Although step 610 illustrates the AD plugin 431 acquiring user credentials, in some implementations customer AD server 441 may operate to prompt the user for credentials.

At step 618, AD plugin 431 may optionally convert the received AD authentication token to a standard and/or specialized format associated with authentication system 520. As noted above, the authentication system 520 may provide relying parties with authentication tokens in a common format used by authentication system 520 that differs from the format provided by the federated identity providers. This may allow for reuse among other applications that utilize authentication system 520, and may support single sign on (SSO) features between different applications provided by commonly managed systems via authentication system 520. The standard form AD authentication token (or original AD authentication token) may be returned to authentication interface 525 at step 620. At step 622, authentication interface 525 may return the AD authentication token to AD+OTP plugin 535, thereby completing the request by AD+OTP plugin 535 (as a relying party) to authenticate the user device using the AD authentication process.

At step 624, AD+OTP plugin 535 may further self-federate to authentication interface 525 to handle the remaining OTP portion of the compound AD+OTP authentication process initiated by relying party 510 in step 600. At step 626, AD+OTP plugin 535 may generate and send a request to authenticate the user device using an OTP authentication process to authentication interface 525. Again, in this subsidiary authentication process call, AD+OTP plugin 535 may be acting as the relying party.

Similarly to the AD authentication request, application interface 525 may receive the request to authenticate the user device using the OTP authentication process from AD+OTP plugin 535, and may treat the AD+OTP plugin 535 as the relying party for that request. Application interface 525 may determine that the request from AD+OTP plugin 535 corresponds to an OTP authentication process, and may determine that OTP plugin 437 should handle the request. As explained above, the authentication request may include information, such as a parameter, that indicates (explicitly and/or implicitly) the type of authentication process to be used to authenticate the user's access to the resources. The authentication system 520 may select a plugin corresponding to the type of authentication process indicated by the parameter. Thus, at step 628, application interface 535 may call OTP plugin 43 to handle the OTP authentication request received from AD+OTP plugin 535 as a relying party.

At step 630, OTP plugin 437 may get user One Time Password (OTP) credentials or proof of access to a multi-factor authentication device. For example, OTP plugin 437 may cause a text message to be sent to a registered SMS number of the user's mobile device, or may receive as input a time-based one time password code from an authentication device of the user. OTP plugin 437 may, at step 632, request to authenticate the user device with OTP server 447. OTP server 447 may be a federated identity provider, and may be associated with the enterprise hosting authentication system 520 and/or a third party network. The request may be to obtain a third authentication token, an OTP authentication token. The request may comprise the gathered user credentials, e.g., the one time password. If the OTP server 447 is configured to confirm multi-factor authentication in another manner, such as having an authentication device of the user send a message directly to OTP server 447, the request may not require credentials, but may include information identifying the request and the user device to be authenticated. At step 634, OTP server 447 may authenticate the user based on the credentials in the request and/or OTP/multi-factor authentication information corresponding to the request using known techniques. For example, OTP server may send an SMS message to a mobile phone associated with the user, and the user may enter a one time code into a page provided by OTP server 447 and/or authentication system 520. If the user successfully authenticates, OTP server 447 may respond to the OTP plugin 437 with an OTP authentication token at step 636. For example, as a result of the user successfully logging into the virtual, cloud-based enterprise system using OTP authentication, OTP server 447 may issue the OTP authentication token. Although step 630 illustrates the OTP plugin 437 acquiring user credentials, in some implementations OTP server 447 may operate to prompt the user for credentials.

At step 638, OTP plugin 437 may optionally convert the received OTP authentication token to a standard and/or specialized format associated with authentication system 520. The standard form OTP authentication token (or original OTP authentication token) may be returned to authentication interface 525 at step 640. At step 642, authentication interface 525 may return the OTP authentication token to AD+OTP plugin 535, thereby completing the request by AD+OTP plugin 535 (as a relying party) to authenticate the user device using the OTP authentication process.

At step 644, AD+OTP plugin 535 may combine the AD and OTP authentication tokens, received from AD plugin 431 and OTP plugin 437 via application interface 525, to generate the first token responsive to the original request by replying party 510 to authenticate the user device based on the compound AD+OTP authentication process from step 600. As discussed above, a combined token in a special format used by authentication system 520 may allow for later requests to the system, from the originating application and/or other applications, to utilize single sign on (SSO) features to access network resources via authentication system 520. AD+OTP plugin 535 may return the combined AD+OTP authentication token to authentication interface 525 at step 646. At step 648, authentication interface 525 may return and/or pass through the combined AD+OTP authentication token to relying party 510 in response to the request to authenticate the user device using the compound AD+OTP authentication from step 600, thereby completing the response to the original request. Although the combined token is illustrated as being returned to and via authentication interface 525, in some embodiments the AD+OTP plugin 535 may return the combined token directly to relying party 510.

Self-federation in this manner may allow for beneficial code path reuse and leverage existing workflows to support compound authentication processes. This may avoid having duplicate code paths, where multiple plugins each include the logic to process a given type of authentication process. Self-federation may simplify implementation of custom authentication work flows by reusing existing code paths. Self-federation may also support integration with third party authentication code and systems, by allowing custom authentication workflows to incorporate third party authentication modules without needing access to the underlying code.

The AD+OTP authentication token (or other authentication tokens) may enable user devices managed by the relying party 510, such as client device 505, to access network resources and establish sessions using network resources. For example, client device 505 and/or authentication system 520 may provide the authentication token to a session manager associated with the network resource. The session manager may rely on the authentication token as proof that the user's identity has been authenticated via the corresponding authentication process. The session manager may establish a session with client device 505 based on confirming the validity of the authentication token. Through the session, client device 505 may access network resources and services. In some embodiments, the AD+OTP authentication token (or other authentication tokens) may further enable user devices to have single-sign-on (SSO) access to one or more resources using an enterprise identity service provided by an enterprise identity server, e.g., the authentication system 520. For example, enterprise servers (relying parties) may receive the authentication token from enterprise identity provider servers. As an example, relying party 510 may store the AD+OTP authentication token (or other authentication tokens obtained by the authentication system 520 and returned to the relying party 510 or derived from those tokens) in a key store of the enterprise system. In some instances, the authentication token may be specific to authentication system 520 and may be interpreted by authentication system 520, which may enable user devices to have SSO access to various services and resources provided by the enterprise system within the enterprise network. SSO may be a property of access control of multiple related, yet independent services and resources in an enterprise system. As an example, a user may log in with a single ID and password to gain access to connected systems without using different usernames or passwords, or seamlessly sign on at each system. Accordingly, a single authentication may provide access to multiple applications, services and resources by passing the authentication token seamlessly in the enterprise system integrated with authentication system 520.

In some instances, when user devices attempt to login using the federated identity services, federated identity provider servers may issue an evidence of the successful sign-in the format of a SAML token, OpenID Connect Identity token, OAuth Access Token, or other form of token. In particular, such authentication tokens may enable the user devices (such as client device 505) managed by the enterprise server (such as relying party 510) to have single-sign-on access to the third party system using the federated identity service. In some instances, the type of evidence of successful login issued by federated identity providers may range from an authentication or identity token, to specialized claims or assertions that come from the federated identity provider server.

For subsequent requests from the enterprise server to access the third party system, the enterprise server (e.g. relying party 510) may present the authentication token to the enterprise identity provider server. Specifically, as an example the AD+OTP authentication token previously issued to the enterprise server by the enterprise identity provider server at step 648 may later be used to support SSO to the same or other network services. As another example, where the user device has previously authenticated via the AD authentication process, the authentication system 525, relying party 510, and/or client device 505 may already have an AD authentication token. During the AD+OTP authentication process, the AD plugin 431 may determine that user credentials associated with the AD authentication process were previously received and that a single sign on (SSO) token associated with the AD authentication process is available to the system. The AD plugin may return the SSO token as the AD authentication token if it determines an SSO token is available. In some instances, the authentication token issued to the enterprise identity provider server for that user or user devices may be a temporary token. As an example, the authentication token may last for an hour. In those scenarios, the authentication token may need to be refreshed.

Figure 7:
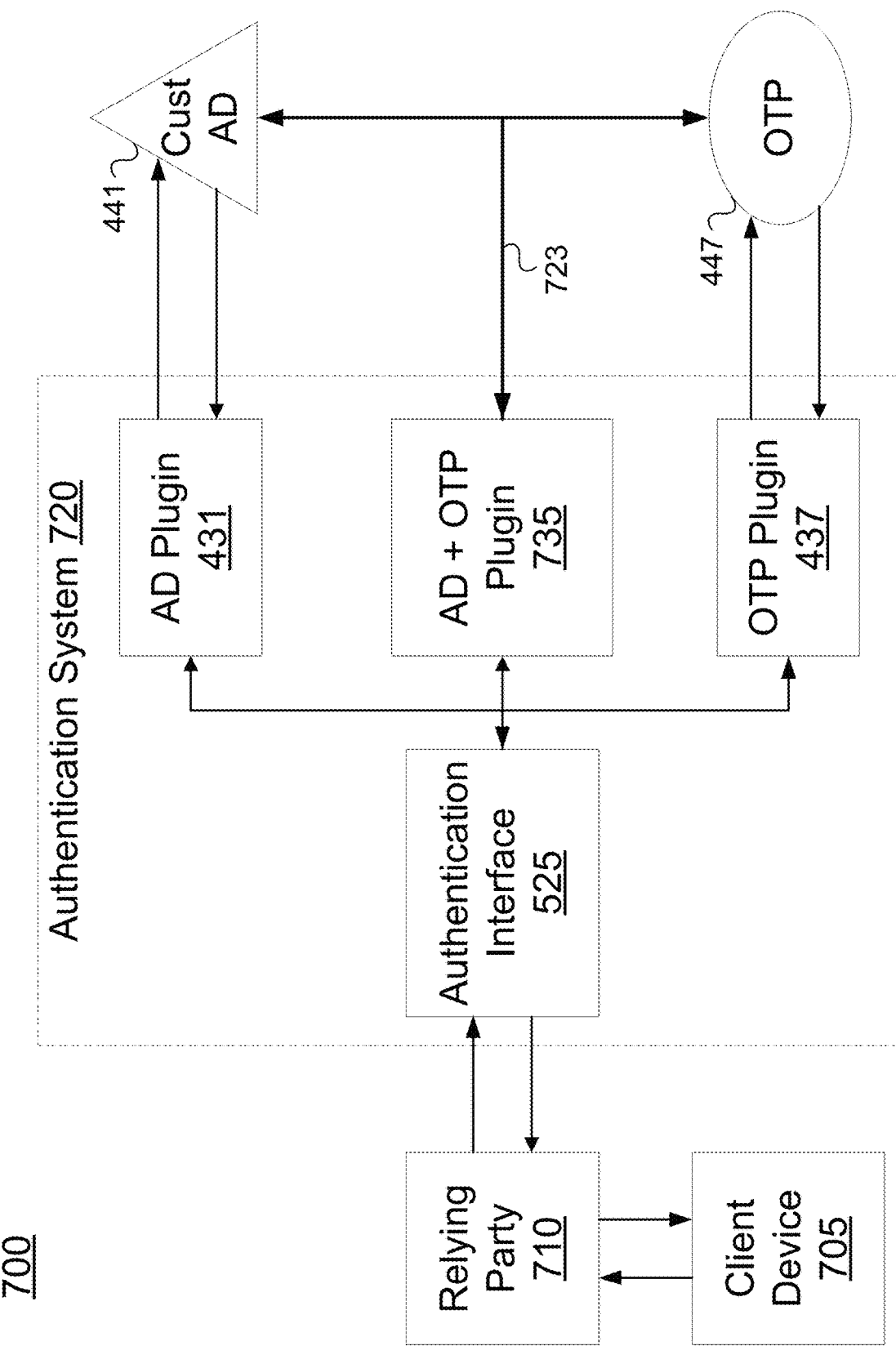
FIG. 7 depicts an example plug-in based authentication system implementing combined authentication processes without self-federation, according to some aspects.

FIG. 7 illustrates an alternative embodiment according to some aspects. Computing environment 700 comprises authentication system 720, but AD+OTP plugin 735 implements a compound authentication process without self-federating to authentication interface 525. Instead of self-federating back to authentication interface 525 to handle AD and OTP subcomponents of the compound authentication process, AD+OTP plugin 735 may comprise logic to handle the AD authentication process and the OTP authentication process on its own.

In the example of FIG. 7, relying party 710 may request authorization to access resources secured by a combined Active Directory (AD) and One Time Password (OTP) authentication process. Authentication system 720 may include AD+OTP plugin 735, which may be configured to handle the combined AD+OTP authentication process without using self-federation back to authentication interface 525 (as illustrated by direct interface 723).

Relying party 710 may send requests to authenticate to authentication interface 525. A request for authentication indicating that relying party 710 would like to authenticate a client device 705 using a combined AD and OTP authentication process may be handled by AD+OTP plugin 735. AD+OTP plugin 735 may process the request to generate a combined AD+OTP authentication token in the format of the authentication system. In this embodiment, AD+OTP plugin 735 may utilize direct interface 723 (e.g., AD+OTP plugin 733 calls an API of AD server 441 and OTP server 447 itself instead of through self-federation to AD plugin 431 or OTP plugin 437 to coordinate with customer AD server 441 and OTP server 447, rather than self-federating through application interface 525 and using AD plugin 421 and OTP plugin 437. AD+OTP plugin 735 may perform steps similar to those performed by AD plugin 421 and OTP plugin 437 (see FIG. 6) to get the AD authentication token and the OTP authentication token. AD+OTP plugin 735 may combine the AD authentication toke and the OTP authentication token and return it to relying party 710 via authentication interface 525.

As discussed above, self-federation may offer numerous benefits in reducing the complexity of the authentication system 520. But the alternative embodiment without self-federation in FIG. 7 may provide benefits as well, such as allowing for elimination of redundant steps across two different plugins responsible for the individual authentication processes. Accordingly, in some embodiments, the authentication system 720 may be configured with plugins supporting compound workflows, and the corresponding plugin for each workflow may utilize self-federation as appropriate. For some compound workflows, self-federation may offer the benefits described above. For other compound workflows, particularly those made up of authentication processes that have redundant steps, the corresponding plugin may be implemented without self-federation. Thus, hybrid systems are envisioned where some compound workflows are handled by self-federation and other compound workflows are handled by direct interface logic that does not self-federate.

Figure 8:
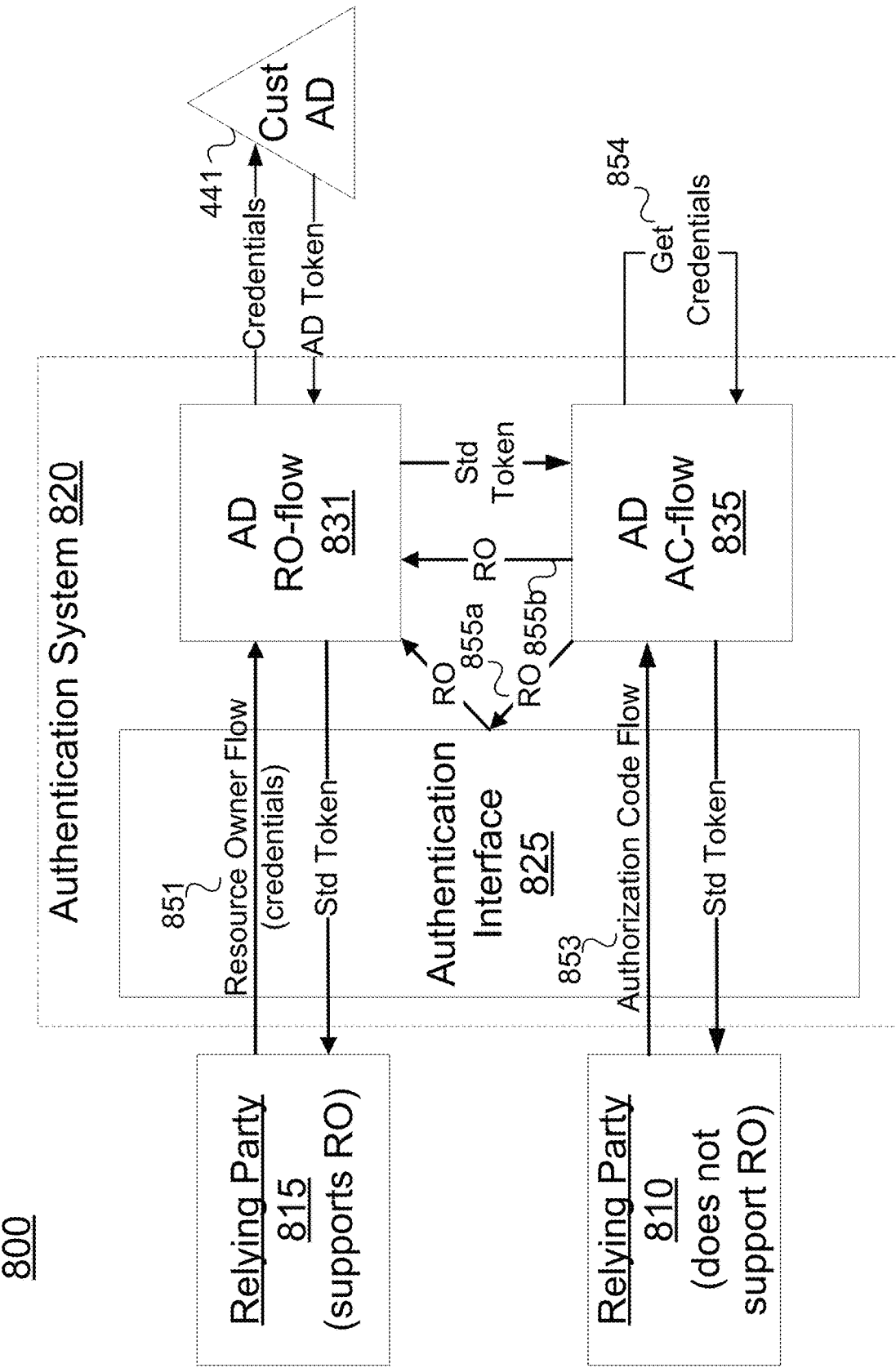
FIG. 8 depicts an example plugin-based authentication system operative to combine a first authentication flow to a second authentication flow.

FIG. 8 illustrates a process through which authentication flows of one type may be transformed into another type. In particular, aspects discussed herein regarding the authentication system may enable the system to transform an authorization code flow initiated by a relying party into a resource owner flow suitable for authenticating with a federated identify provider. Federated identify provider servers may be configured as having a role in a resource owner flow, which may comprise receiving user credentials, providing them to the server, and receiving back an authentication token. Some relying parties may also support resource owner flows, such as where the relying party is an application or service that can securely receive user credentials. Resource owner flows may be associated with the OAuth authentication framework, and may comprise a resource owner password credentials grant under that framework. But other relying parties may be unable to support resource owner flows, such as where the relying party is an application or service that cannot securely receive user credentials (e.g., an untrusted application). These other relying parties, unable to support resource owner flows, may instead implement authorization code flows to utilize other systems (such as the authentication systems discussed herein) to implement resource owner flows on their behalf and obtain authentication tokens. Authorization code flows may be associated with the Open ID Connect (OIDC) authentication layer, which may be on top of the OAuth 2.0 authentication framework. In an authorization code flow, a relying party may indicate that it wants to authenticate to an identify provider. The identity provider, in the authorization code flow, gathers credentials, authenticates the user, and returns an authorization token and/or code to the relying party. The relying party is able to use this code to obtain access to secured resources despite not having access to user credentials.

In some authentication systems, relying parties may implement OIDC authorization code flows and not OAuth resource owner flows. This may be due to design considerations for a system, where managed applications are not intended to securely handle client credentials, for example. But some identity providers may require OAuth resource owner flows. A plugin may be provided to convert an authorization code flow to a resource owner flow in the authentication system, according to some aspects described herein.

FIG. 8 illustrates computing environment 800 where authentication system 820 operates to authenticate a user device with customer AD server 441. FIG. 8 depicts two relying parties: relying party 810 which may not support a resource owner flow (e.g., it is not configured to securely receive user credentials), and relying party 815 which may support resource owner flows (e.g., it may securely receive user credentials).

Relying party 815, which supports resource owner flow 851, may send a request to authenticate a user device to authentication system 820 via authentication interface 825. Relying party 815 may gather credentials and include them in the request. Authentication interface 825 may route the resource owner flow request received from relying party 815 to a corresponding plugin, such as AD RO-flow plugin 831. AD RO-flow plugin 831 may be a plugin software module configured to process a resource owner flow request for AD authentication and interface with customer AD server 441. AD RO-flow plugin 831 may provide credentials to customer AD server 441 and receive back an AD token, as described with respect to FIG. 4 and AD plugin 431. AD RO-flow plugin 731 may convert the AD token to a standard format, and the converted token (or the original AD token) may be returned to relying party 815.

Authentication system 820 may further operate to translate an authorization code flow to a resource owner flow to federate relying parties that need OIDC authorization code flow where the identity provider supports OAuth resource owner flows. For example, relying party 810, which does not support resource owner flows, my initiate an OIDC authorization code flow 853 to authenticate a user device using authentication system 820 via authentication interface 825. Authentication interface 825 may determine that AD AC-flow plugin 835 corresponds to the request from relying party 810, and may pass the request from relying party 810 to AD AC-flow plugin 835. AD AC-flow plugin 835 supports resource owner flows, and may initiate a resource owner flow 855a or 855b corresponding to the requested authentication process in the authorization code flow received from relying party 810. AD AC-flow plugin 835 may get credentials 854 associated with the user as part of a RO flow, such as by causing a prompt to be generated for the user to provide a user name and password. AD AC-flow plugin 835 may then request authentication of the user device via a resource owner flow suitable for authentication by customer AD server 441. AD AC-flow plugin 835 may implement this resource owner flow through the self-federation techniques described above and/or through direct communication with AD RO-flow plugin 831, as illustrated in FIG. 8. For example, resource owner flow 855a may be implemented using self-federation via authentication interface 825, while resource owner flow 855b may be implemented through direct communication (e.g., API calls) between AD AC-flow plugin 835 and AD RO-flow plugin 831. AD RO-flow plugin 831 may proceed as above, and may get the AD token for the user device. This token may be returned to AD AC-flow plugin 835, which may return the token (or a converted token) to relying party 810. Thus, even though relying party 810 does not support resource owner flows, authentication system 820 is able to convert the resource owner flow initiated by relying party 810 into a resource owner flow and implement authentication processes.

As an example, relying party 815 may be a web application that supports resource owner flows. When relying party 815 needs to authenticate a user device, relying party 815 may redirect the user to an identity provider website that request user name, password, and multi-factor authentication token (for example). But relying party 810 may be a workspace application that does not gain access to user credentials such as user name and password. The workspace application may initiate an authorization code flow to the authentication system 820, and the authentication system 820 (through AD AC-flow plugin 835) may prompt the user to enter credentials. The AD AC-flow plugin 835 may thus effect a protocol transition between an authorization code flow and a resource owner flow. This may be accomplished through self-federation to AD RO-flow plugin 831 via authentication interface 825, One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computer-implemented method comprising:
   receiving, by a combined authentication plugin executing on a computing device, from an authentication requesting device, a request to authenticate an endpoint:
   self-federating, by the combined authentication plugin, the request to authenticate;
   initiating a first call, by the combined authentication plugin, to a first authentication plugin, the first authentication plugin configured to initiate authentication of the endpoint by a first identity provider;
   initiating a second call, by the combined authentication plugin, to a second authentication plugin, the second authentication plugin configured to initiate authentication of the endpoint by a second identity provider;
   in response to authentication of the endpoint by the first and second identity providers, generating, by the combined authentication plugin, a combined, self-federated token based on at least two other tokens provided by the first and second identity providers, the combined token being in a format to allow subsequent requests to authenticate the endpoint to use any one of the different identity providers; and
   providing the combined authentication token to the authentication requesting device for use in subsequent authentication requests.

2. The computer-implemented method of claim 1, wherein the combined token enables the endpoint to establish a session with network resources associated with the first and/or second identity providers.

3. The computer-implemented method of claim 1, wherein the combined token is generated by combining tokens received from the first and second identity providers.

4. The computer-implemented method of claim 1, wherein the format is associated with the computing device or the endpoint.

5. The computer-implemented method of claim 1, wherein at least one of the identity providers comprises is an Active Directory authentication process.

6. The computer-implemented method of claim 1, wherein at least one of the identity providers comprises a one time password authentication process.

7. The computer-implemented method of claim 1, wherein the request to authenticate the endpoint is associated with a relying party, and wherein:
   the endpoint is the relying party for the request; and a plugin is the relying party for a first subsequent request to authenticate the endpoint by the first identity provider and a second subsequent request to identity the endpoint by the second identity provider.

8. The computer-implemented method of claim 1 further comprising:
   in response to the first call, sending, by the first authentication plugin, a first authentication token to the combined authentication plugin; and
   in response to the second call, sending, by the first authentication plugin, a second authentication token to the combined authentication plugin;
   wherein the combined token is based on the first and second authentication tokens.

9. A computer system having at least one processor, hardware memory, and a set of instructions stored on the memory, the set of instructions comprising instructions which, when executed by the at least one processor, cause the computer system to:
   receive, by a combined authentication plugin executed by the computer system, from an authentication requesting device, a request to authenticate an endpoint;
   self-federate, by the combined authentication plugin, the request to authenticate;
   initiate a first call, by the combined authentication plugin, to a first authentication plugin, the first authentication plugin configured to initiate authentication of the endpoint by a first identity provider;
   initiate a second call, by the combined authentication plugin, to a second authentication plugin, the second authentication plugin configured to initiate authentication of the endpoint by a second identity provider;
   in response to authentication of the endpoint by the first and second identity providers, generate, by the combined authentication plugin, a combined, self-federated token based on at least two other tokens provided by the first and second identity providers, the combined token being in a format to allow subsequent requests to authenticate the endpoint to use any one of the different identity providers; and
   provide the combined authentication token to the authentication requesting device for use in subsequent authentication requests.

10. The computer-implemented method of claim 9, wherein the combined token enables the endpoint to establish a session with network resources associated with the first and/or second identity providers.

11. The computer-implemented method of claim 9, wherein the combined token is generated by combining tokens received from the first and second identity providers.

12. The computer-implemented method of claim 9, wherein the format is associated with the computing device or the endpoint.

13. The computer-implemented method of claim 9, wherein at least one of the identity providers comprises Active Directory authentication process.

14. The computer-implemented method of claim 9, wherein at least one of the identity providers comprises a one time password authentication process.

15. The computer-implemented method of claim 9, wherein the request to authenticate the endpoint is associated with a relying party, and wherein:
   the endpoint is the relying party for the request; and a plugin is the relying party for a first subsequent request to authenticate the endpoint by the first identity provider and a second subsequent request to identity the endpoint by the second identity provider.

* * * * *